Aug. 13, 1940. J. L. CAMPBELL 2,210,899
ABSORPTION MEANS AND METHOD FOR REFRIGERATING SYSTEMS
Original Filed Sept. 20, 1929 9 Sheets-Sheet 7
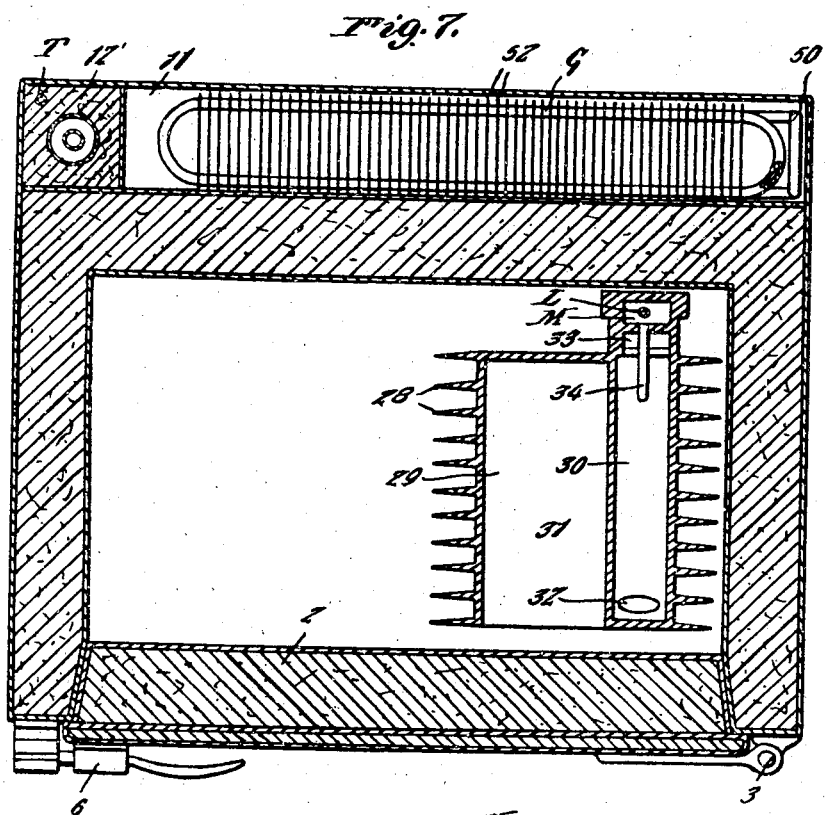
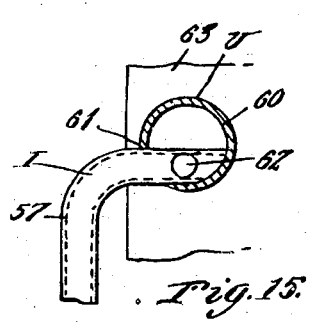
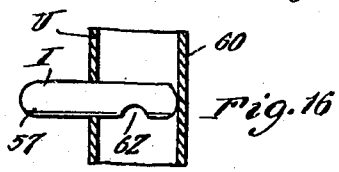
Jackson Lee Campbell,
INVENTOR.
BY
ATTORNEY.

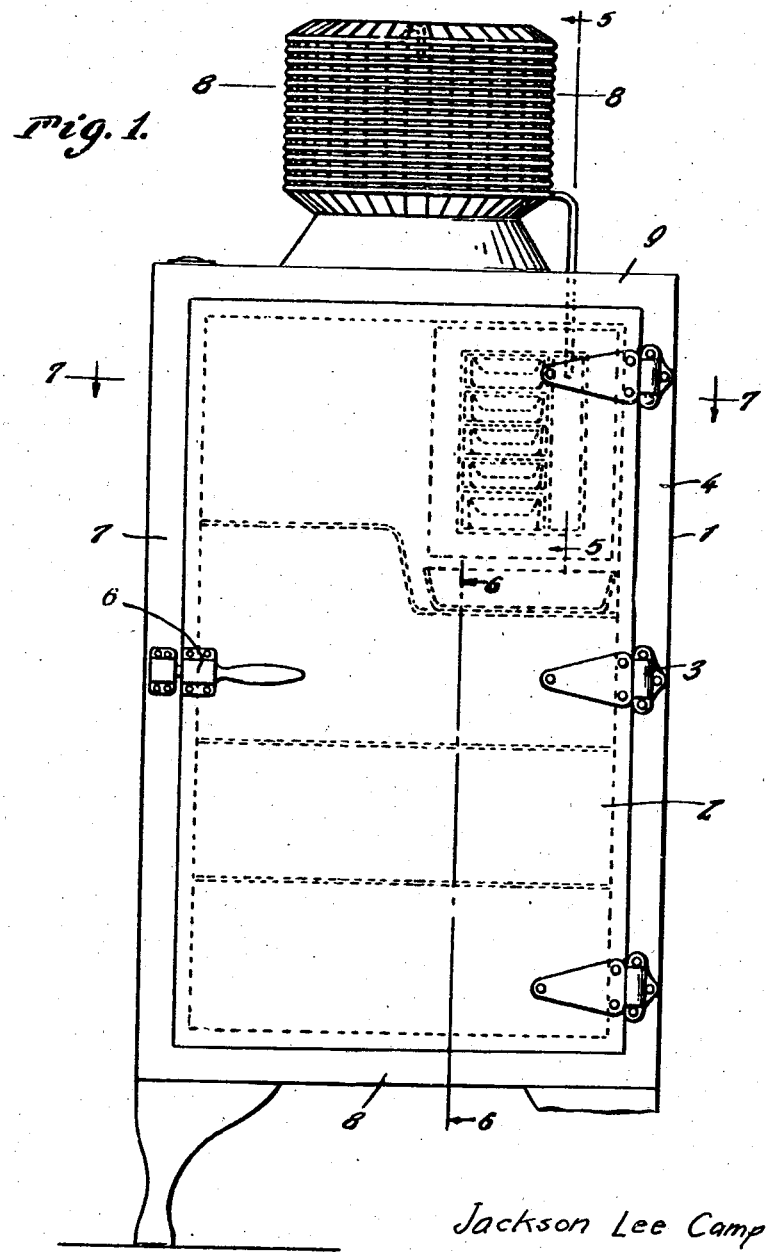

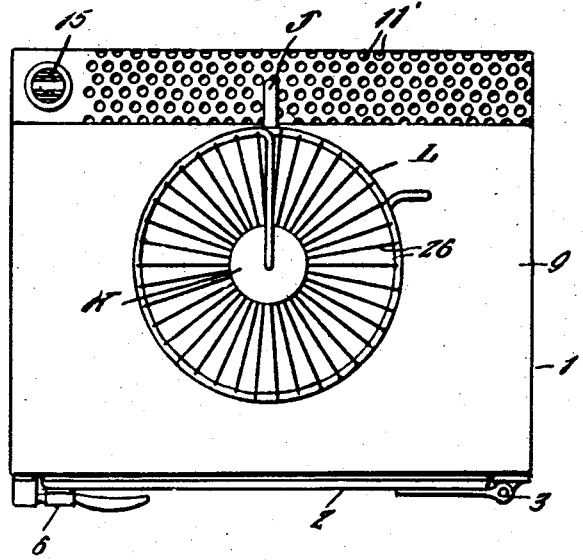
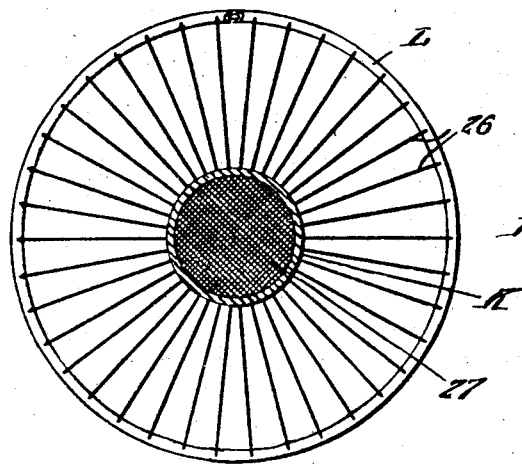
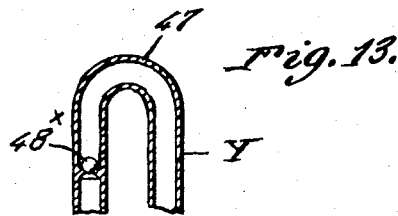
Jackson Lee Campbell,
INVENTOR.

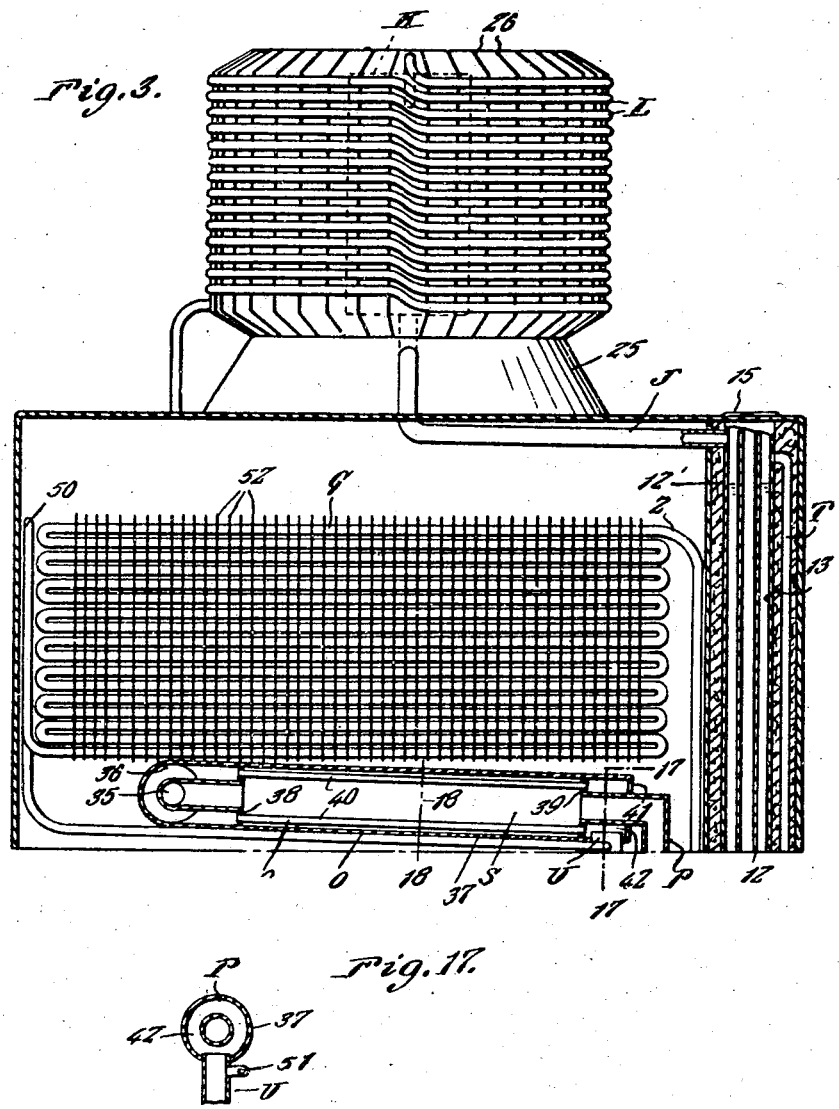

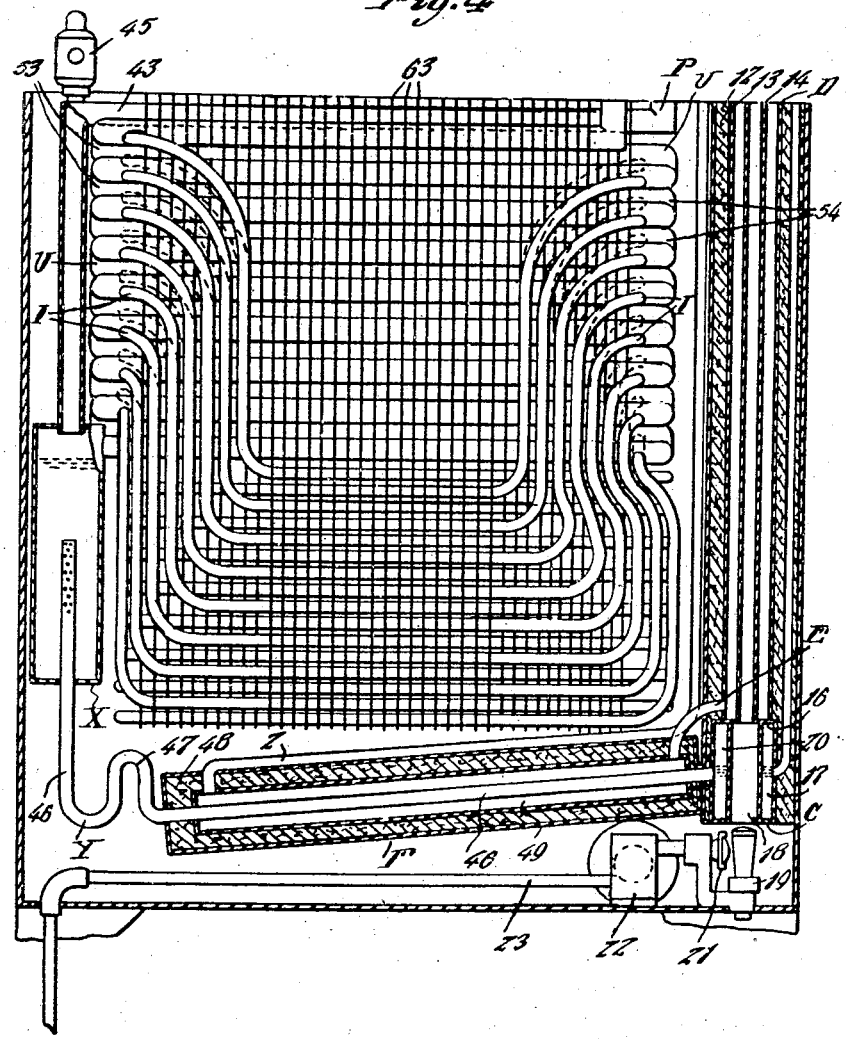

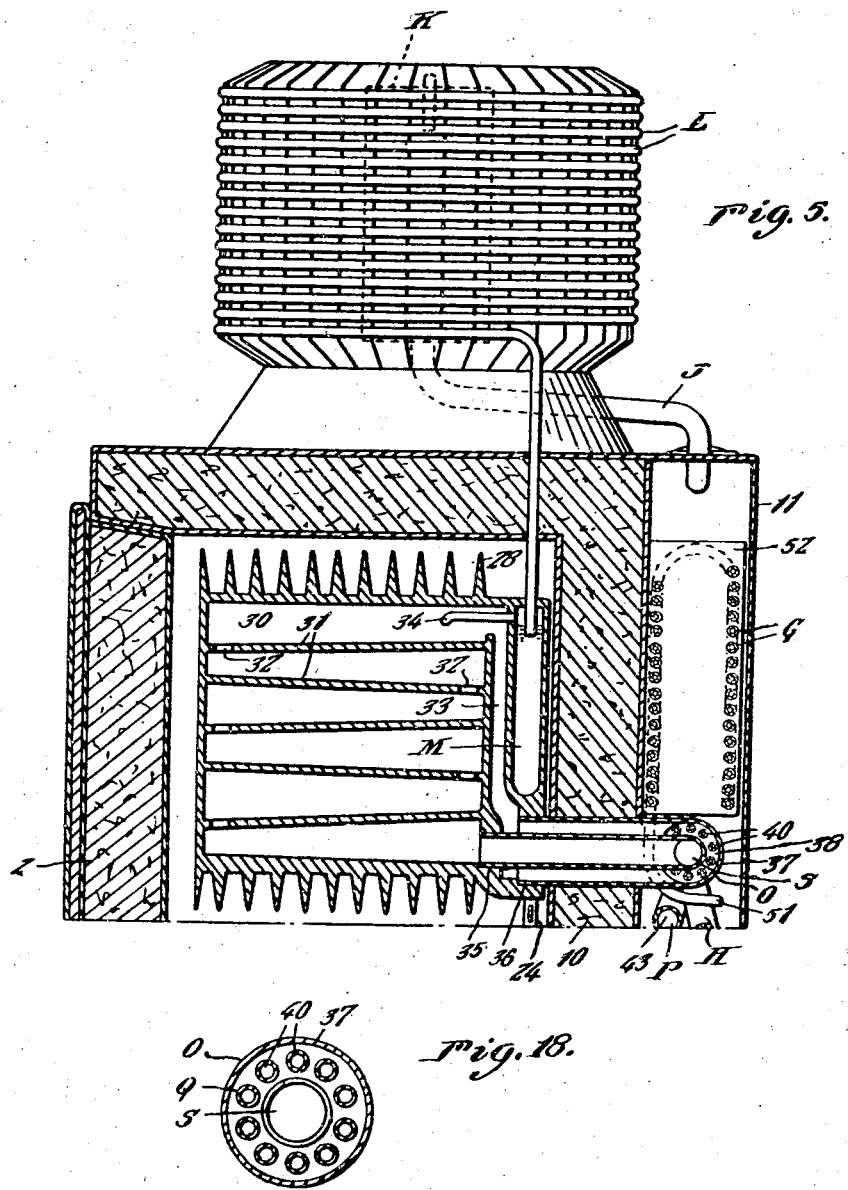

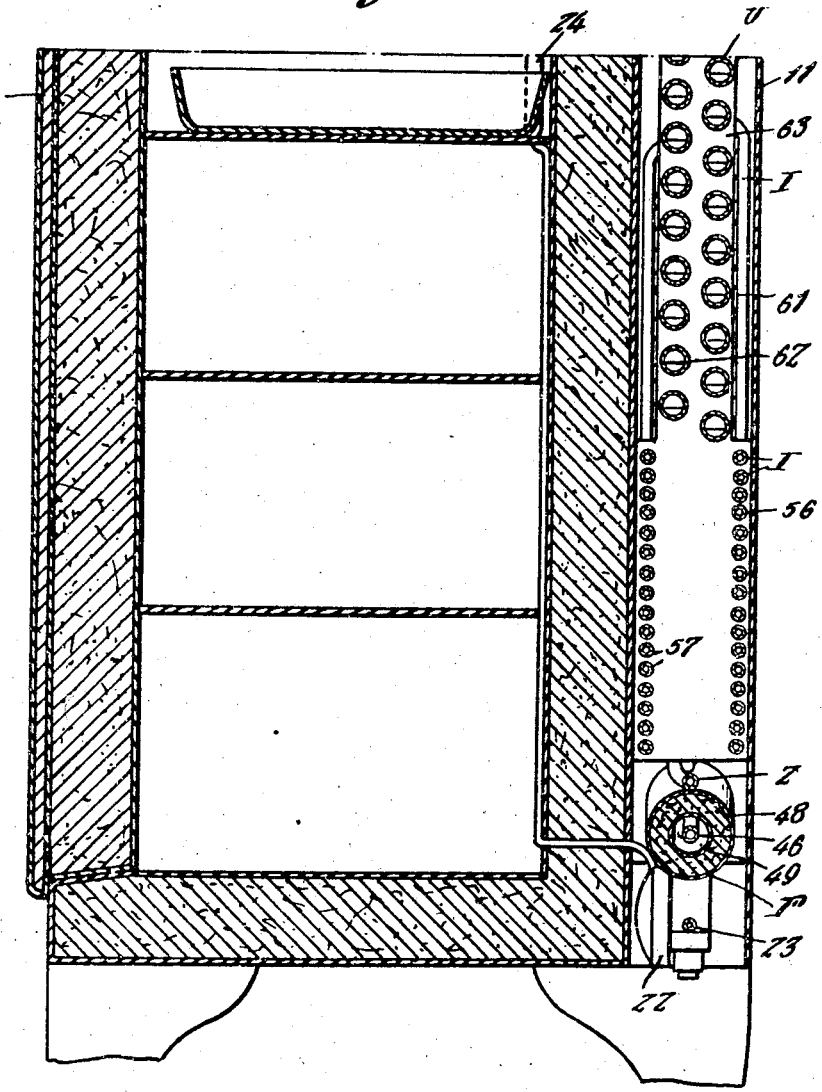

Aug. 13, 1940. J. L. CAMPBELL 2,210,899
ABSORPTION MEANS AND METHOD FOR REFRIGERATING SYSTEMS
Original Filed Sept. 20, 1929 9 Sheets-Sheet 8
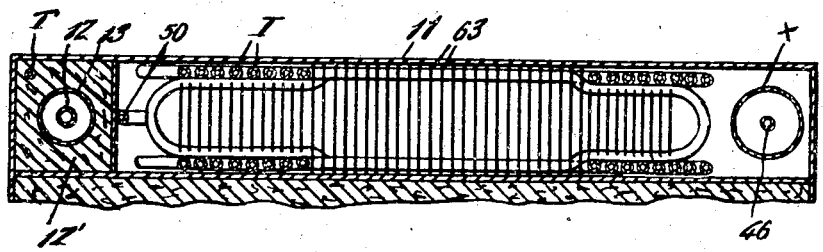
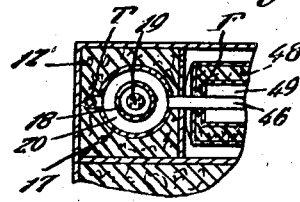
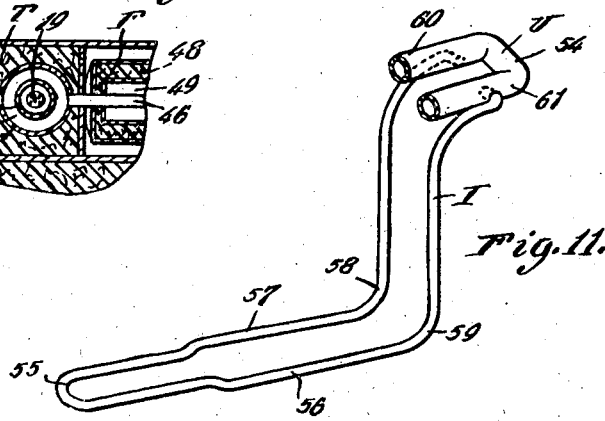
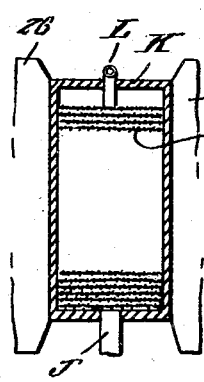
Jackson Lee Campbell,
INVENTOR.
BY Frank H. Marks,
ATTORNEY.

Aug. 13, 1940.   J. L. CAMPBELL   2,210,899
ABSORPTION MEANS AND METHOD FOR REFRIGERATING SYSTEMS
Original Filed Sept. 20, 1929   9 Sheets-Sheet 9

Jackson Lee Campbell,
INVENTOR.
BY
ATTORNEY.

Patented Aug. 13, 1940

2,210,899

UNITED STATES PATENT OFFICE 2,210,899

ABSORPTION MEANS AND METHOD FOR REFRIGERATING SYSTEMS

Jackson Lee Campbell, Wichita, Kans., assignor, by mesne assignments, to Sears, Roebuck and Co., Chicago, Ill., a corporation of New York Original application September 20, 1929, Serial No. 394,011. Divided and this application June 6, 1939, Serial No. 277,617

18 Claims.  (Cl. 261—11)

This application is a division of my co-pending application S. N. 394,011, filed September 20, 1929.

This invention relates to air-cooled continuous absorption refrigerating units.

It has been the experience in the refrigerating art that all refrigerants resist re-absorption in the absorption liquids under working conditions of artificial refrigeration, unless an external cooling medium such as cool water, is employed to carry away the heat of solution which is evolved during absorption. It is therefore, one of the objects of the present invention to effect thorough and complete re-absorption by the novel construction of the absorber, without resorting to the use of such a cooling medium.

Another object of the invention is to arrange the convolutions of the cooling coil of the absorbing unit in conjunction with cooling loops arranged on each convolution to retard the flow of a unit of volume of the absorption agent; allowing ample time for the heat of solution of the cooling agent to be dissipated by convection currents set up in still air due to this heat, thereby causing the absorption agent to absorb to its original saturation point the cooling agent in time to continue another cycle of operation.

A still further object of the invention is to provide at critical points in the cycle of operation, large but compact cooling fins that serve to reduce the temperature without the use of water as a cooling agent.

Another salient feature of the present invention is to provide a balance of pressures and temperatures within the unit so that there will be a continuous cycle of operation that will dissipate a maximum amount of heat.

Further objects of the invention are to provide, in a manner as hereinafter set forth, a refrigerating unit of the character referred to, that is strong, compact and durable, thoroughly reliable in its intended purpose, very simple in its operation, extremely simple in its method of assembly, adapted for insertion in standard sized refrigerator cabinets and comparatively inexpensive to manufacture and operate.

With the foregoing and other objects in view, the invention consists of a novel construction, combination and arrangement of parts as will be hereinafter more specifically described and illustrated in the accompanying drawings, wherein is disclosed an embodiment of the invention, but it is to be understood that changes, variations and modifications may be resorted to without departing from the spirit of the claims hereunto appended.

In the drawings wherein like reference characters denote corresponding parts throughout the several views:

Figure 1 is a front elevation of a refrigerator cabinet provided with a refrigerating unit in accordance with the present invention.

Figure 2 is a top plan view of the cabinet of Figure 1.

Figure 14:
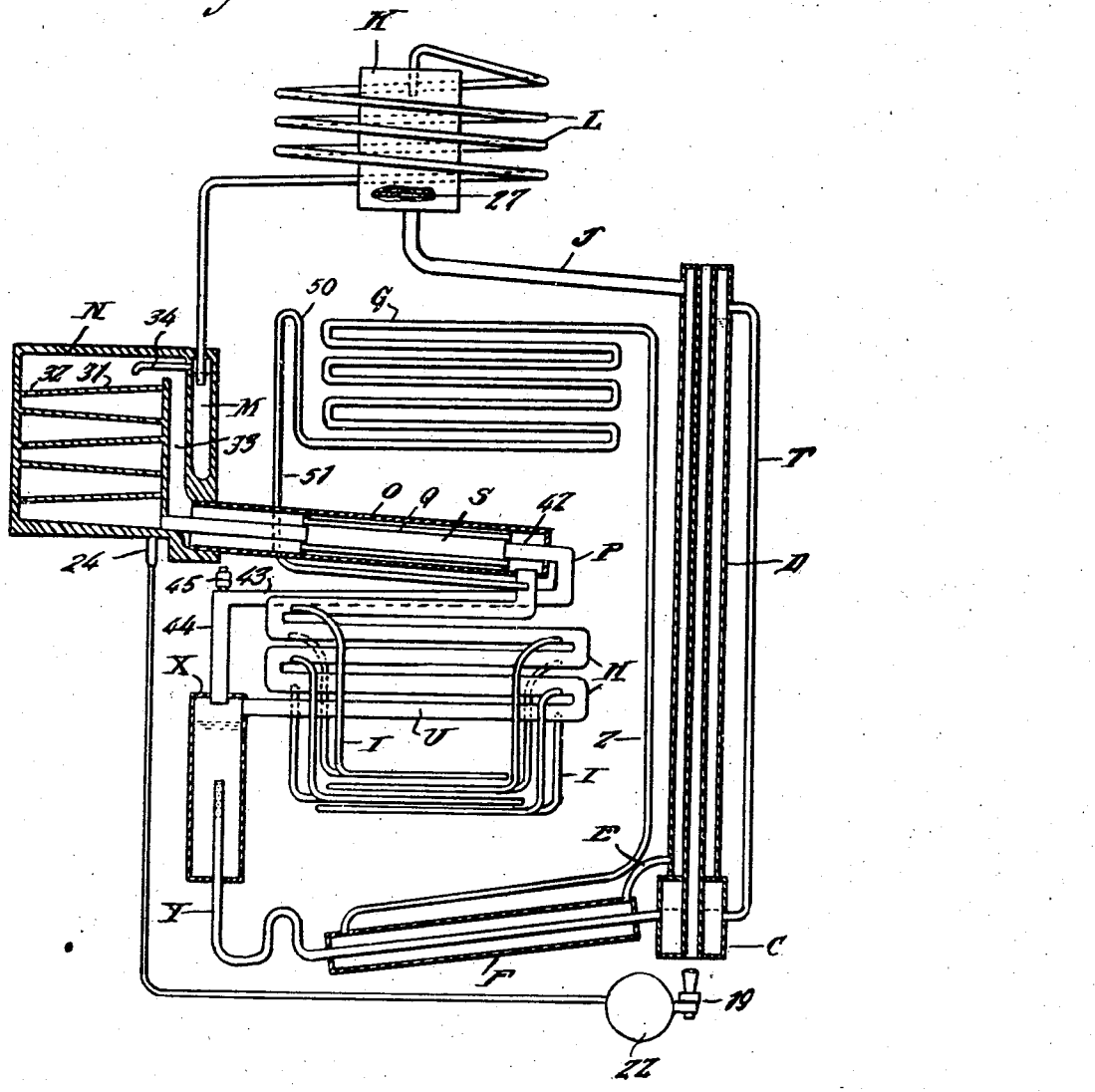

Figures 3 and 4 taken together represent a vertical section in detail, enlarged and having the back of the cabinet removed, Figure 3 being the upper portion thereof, and Figure 4 being the lower section thereof.

Figure 5 is a vertical section in detail taken substantially on line 5—5 of Figure 1 and looking in the direction of the arrows.

Figure 6 is a vertical section in detail taken substantially on line 6—6 of Figure 1.

Figure 7 is a horizontal section in detail taken substantially on line 7—7 of Figure 1.

Figure 8 is a horizontal section in detail taken substantially on line 8—8 of Figure 1.

Figure 9 is a horizontal section in detail taken through the lower portion of the rear wall illustrating the method of arranging the lower tubes of the absorber.

Figure 10 is a transverse section in detail through the sub-generator.

Figure 11 is a fragmentary perspective view illustrating the arrangement of the tubes of the absorber.

Figure 12 is a vertical sectional view through the rectifier.

Figure 13 is a vertical sectional view in detail of the strong liquid conducting tube leading from the strong liquid receiving member to the liquid heat exchanger.

Figure 14 is a diagrammatic view of the refrigerating unit in accordance with the present invention.

Figure 15 is a vertical section in detail through one of the tubes of the absorber.

Figure 16 is a horizontal section in detail through one of the tubes of the absorber.

Figure 17 is a vertical section in detail taken substantially on line 17—17 of Figure 3.

Figure 18 is a vertical section taken substantially on line 18—18 of Figure 3.

All parts of the present unit are preferably made of steel tubing and containers and all joints are formed by welding so that a sealed continuous unit may be formed to carry out the present invention.

The refrigerating unit in accordance with the present invention is adapted to be installed in a conventional refrigerating cabinet indicated generally at 1 having a door 2 hingedly connected as at 3 to the forward edge of one side wall 4. The door is provided with suitable latching means 6 so as to seal the interior of the cabinet when the door is closed. The other side wall is indicated at 7, the bottom wall is indicated at 8, and the top wall is indicated at 9. The back wall of the cabinet is indicated at 10 and supported thereon is a vertically disposed hollow shell 11 which forms a compartment on the back of the cabinet co-extensive with the back wall and is insulated from the interior of the refrigerator cabinet by the rear wall 10. The side walls, the top and bottom walls, the door, and the back wall 10 of the cabinet is provided with suitable insulating material so as to provide resistance to the flow of heat to the interior of the cabinet through the walls thereof.

In one corner of the shell there is provided a square compartment 12 through which the generator D and the sub-generator C extend. The walls of the compartment 12 are properly insulated from the walls of the generator D and sub-generator C. The generator D consists of a vertically disposed, tubular outer shell 13 and a spaced tube 14 which extends through the outer shell 13 concentric therewith to provide a compartment between the tube and the shell for receiving the liquid to be presently referred to.

The upper end of the outer shell 13 is closed by a cap 15 having an opening in its center which registers with the tube 14 so that excess heat from the tube 14 may be conducted to the atmosphere. At the lower end the generator D has the compartment between the shell 13 and the tube 14 sealed by a bridgewall 16 that forms also the upper wall of the sub-generator C. The sub-generator C consists of an outer cylindrical shell 17 of slightly greater diameter than the shell 13 and a concentric tube 18 between which there is provided a compartment to receive the strong liquor as will be presently described.

The tube 14 communicates at its lower end with the tube 18 whereby the heat is carried upwardly through the generator and sub-generator. Disposed under the sub-generator C, there is a burner 19 that directs the flame upwardly into the tubes 18 and 14. The compartment 20 between the walls of the shell 17 and the tube 18 is sealed at its upper end by the bridgewall 16 and at its lower end by the bottom wall of the shell so that the sub-generator C is a sealed container independent of the generator D.

The burner 19 is preferably a gas burner, although the system would be adapted for burning acetylene, or any other kind of gas or electric current. A pilot light 21 is disposed on the burner adjacent the tip, and the burner 19 is connected to a thermostatic control member 22 which is connected with a gas supply conductor pipe 23. The thermostatic control member 22 is also connected with a thermo-couple 24 that is disposed near the evaporator inside of the cabinet.

A vertically disposed thermosyphon tube T has its lower end supported on shell 17 and communicates with the compartment 20 thereon. The upper end of the tube T is welded to the shell 13, adjacent the top thereof and communicates with the compartment between the shell 13 and tube 14 of the generator D. One end of an arcuate tube E communicates with the lower end of the compartment between the tube 14 and the shell 13 of the generator D and the other end thereof communicates with one end of the liquid heat exchanger F.

At the top of the generator D, one end of a tubular conductor member J communicates with the compartment between the shell 13 and the tube 12, slightly above the upper end of the thermosyphon tube T. Tube J projects radially inwardly from the generator D and inclines upwardly for the purpose of carrying any condensed liquids back into the generator. The other end of the tube J enters into a hollow cylindrical container K which is herein referred to as a rectifier. The rectifier K is supported upon a base 25 that rests upon the top wall 9 of the cabinet.

The rectifier K has spaced radially projecting fins 26 secured to the side walls thereof, the bottoms of which are also secured to the support 25. Interiorly of the rectifier K there is piled layers of reticulated steel wire 27 that are disposed diametrically of the container (Fig. 12). One end of the condensing coil L leads from the top wall of the rectifier K and is spirally wound about the outer edges of the fins 26 in spaced relation to the walls of the container or rectifier K. The incline of the coil L is downwardly so that liquid will flow therethrough under its own weight.

The lower end of the condensing coil L projects through the top wall 9 of the cabinet and terminates in the liquid receptacle M formed on the inner wall of the evaporator N. The layers of reticulated fabric 27 through the rectifier or container K condense all of the vapor of the absorbing liquid that may have become entrained in the refrigerant gas flow.

The evaporator N is substantially rectangular in configuration formed with laterally projecting fins 28 that form continuous rings about the side, top and bottom walls thereof. The evaporator N has an open-ended compartment 29 for the reception of ice trays indicated in dotted lines on Figure 1 of the drawings. To the side of the compartment 29, the evaporator N is formed with a closed compartment indicated generally at 30 that has a series of spaced, downwardly inclining baffle plates 31 having openings 32 at alternate ends of each plate, which communicate with the underlying baffle plate so that liquid may flow from one to the other of the baffle plates in a circuitous path, while any gases may flow upwardly in the compartment.

Between the end wall of the compartment 30 and the liquid receiving member M there is a flue 33, the upper end of which communicates with the upper baffle plate of the series. A small tubular spout 34 leads from the liquid receiver M, about the terminal of the condensing coil conductor and permits the liquid refrigerant to flow upon the upper baffle plate of the series. The liquid receiver M is a hollow receptacle disposed vertically and preferably formed integral with the inner wall of the evaporator N. The flue 33 is spaced between the one wall of the receiver M and the inner partition wall that supports the inner ends of the baffle plates 31.

Leading from and in communication with the bottom of the compartment 30 of the evaporator N is a small conductor tube 35 that extends concentrically through a larger tube 36 in spaced relation to the walls thereof. The larger tube 36 communicates at its inner end with the lower end of the flue 33 and at its outer end merges with a vertically disposed annular bridge wall in the gas heat exchanger O.

The gas heat exchanger O consists of a tubular outer shell 37, the one end of which merges with the larger tube 36 leading from the evaporator N and the other end is closed by an end wall 38. The interior of the gas heat exchanger O has spaced vertically disposed bridge walls 38, 39, between which are disposed an annular series of small tubes 40. Each of the bridge walls 38 and 39 are formed with a central opening that communicates with the small tube 35 at one end, that leads from the evaporator N and the opening on the other bridge wall is in communication with the tube P.

The compartment between the bridge walls is open and the series of tubes 40 extend through this compartment for the purposes to be presently described. Between the bridge wall 39 and the end wall 41 there is a compartment 42, into which extends the upper convolution U of the absorber H. In the diagrammatic view shown in Figure 14 the inner compartment between the bridgewalls 38, 39 of the gas heat exchanger O is referred to (Figure 14) as S, whereas the series of tubes extending between the bridge walls through the compartment S is designated as Q.

The tube P is bent downwardly where it emerges through the end wall 41 of the heat exchanger and passes across the back wall of the cabinet as at 43 and then merges into a depending section 44 that enters the top of a closed hollow cylindrical container designated at X and referred to as the strong liquid receiving receptacle. Located at the elbow between sections 43 and 44 is a charging valve 45 through which the charge is introduced into the unit. Into the orifice of this charging valve is inserted a fusible plug having a predetermined failure limit, to release the charge should for any reason the pressure within the system rise above the normal working limit.

The strong liquid receiving receptacle X is cylindrical in contour and is disposed in a vertical plane along the backwall of the cabinet in the chamber 11. Extending up through the bottom wall of the strong liquid receiving receptacle X is an outlet conductor Y in the form of a pipe 46 which projects upwardly into the container for approximately half the height thereof. The confined end of the pipe 46 is preferably perforated as shown so as to permit only clean liquid to flow down the conductor 46. The liquid from the receiver X flows by gravity down the conductor 46.

The gooseneck 47 is disposed vertically in the conductor 46 and is provided with an internal check valve 48ˣ, Figure 13, to prevent any back pressure at this critical point in the unit. The conductor 46 then enters one end of the liquid heat exchanger F. The heat exchanger F is disposed at an inclination with respect to a horizontal plane and consists of an outer jacket 48 of insulating material and a longitudinally extending inner chamber or compartment 49, through which the conductor 46 extends.

The conductor 46 emerges from the outer end of the liquid heat exchanger F and enters the compartment 20 of the sub-generator C on substantially the same level as the lower end of the thermo-syphon tube T. The liquid heat exchanger F is located at the bottom of compartment 11 at the lowest point in the system and communicating with the chamber 49, therein, at the highest point thereof, is one end of the arcuate conductor E that communicates with the generator D.

Leading from the compartment 49 of the liquid heat exchanger F is a tube Z that extends upwardly and takes a bend at right angles into the upper end of the weak liquor cooling coil G disposed at the top of the chamber 11. Leading from the lower convolution of the cooling coil G there is a gooseneck 50 of the same height as the top of coil G to prevent or break the syphoning effect in the unit.

From the gooseneck 50 a conductor 51 leads downwardly and empties into the upper end of the upper coil of the absorber H where the large tube emerges from the gas heat exchanger O.

The cooling coil G is provided with a plurality of fins 52 which are disposed between the tubes of the coil for the purpose of dissipating heat into the chamber 11 and out through the perforated top wall 11' thereof. The cooling coil G is continuous in extent and permits the flow of weak liquor therethrough by gravity. The coil G is disposed at the uppermost part of the chamber 11 and above the gas heat exchanger O.

The absorber H consists of a continuous coil of large metal tubing U, the convolutions of which are substantially rectangular. The plane of the rectangular convolutions is at an inclination with respect to a horizontal plane as will be seen by referring to Figure 6. The end sections 53 of each convolution on the same end incline downwardly, while the end sections 54 opposite thereto incline downwardly in opposite directions therefrom as will be seen by referring to Figure 4 of the drawings. One series of individual loops I substantially of U-shaped configurations are secured one to each convolution of the coil U on the same end, and another series of loops I are secured in the same manner to the opposite end of each convolution of the coil U.

The opposed loops are staggered so as to overlap each other in spaced relation. The convolutions of coil U are of greater cross section but of less lineal extent than the loops I. The loops I (Figure 11) have the bights 55 thereof disposed in a horizontal plane and the legs 56, 57 are parallel. Intermediate the ends of the legs 56, 57 they are bent substantially at right angles as at 58, 59 and the ends of the legs enter the opposite sides 60, 61 of each convolution of the coil U adjacent the inclined ends 62.

Referring to Figures 15 and 16 of the drawings, one side 60 of the convolutions U has been selected to illustrate the manner of securing the one leg 57 thereto and it is to be understood that all of the connections of the small loops I are connected with the coil U in the same manner. The end of the leg 57 extends through an opening 61 formed below the center of the side 60 and projects therein having its end in substantial abutment to the opposite wall thereof to form a baffle in the bottom of the side 60. The leg 57 projects into the side 60 at right angles to the axis of the side. An opening 62 is formed in the wall of the leg 57 in the direction of the axis of the side 60 above the lowest point of this side so that some liquid will be contained in the large tubes of the coil U.

The end of the other leg 56 is connected in a like manner to the lower side 61 of the same convolution of the coil U. The lowermost convolution of the coil U enters into the strong liquid receiver X above the liquid level therein and above the end of the strong liquid outlet conductor Y. Extending between the coils U and the tubes I there are spaced fins 63 to dissipate heat into the chamber 11.

By having the convolutions U arranged in inclined rectangular configurations and loops I depending therefrom, the flow of a unit of volume of the absorbing agent is retarded. The retarding allows ample time for the heat of solution of the cooling agent to be dissipated by still air convection thereby causing the absorbing agent to absorb to its original saturation point the cooling agent in time to begin another cycle.

The cooling coil G is disposed in the upper portion of the compartment 11 next to the back wall 10 of the cabinet. The evaporator N is substantially on the same level as the cooling coil G and is in the interior of the cabinet so as to absorb heat therein. The gas heat exchanger O is below the cooling coil G and above the absorber H in the compartment 11. The liquid heat exchanger F is below the absorber H and at the bottom of the compartment 11.

In the application of the invention, the units are assembled and tested for strength under hydraulic pressure of approximately five thousand pounds per square inch. It is then immersed in clear water and subjected to an air pressure of one thousand pounds per square inch to determine if there still remains any infinitely small leaks. When all possible leaks have been discovered and stopped by welding, it is then ready for painting and charging. The charge consists of approximately thirty percent (30%) of ammonia and seventy percent (70%) of water at approximately sixty degrees temperature at atmospheric pressure.

A vacuum is drawn in the unit and a measured quantity of the above charge of water and ammonia is allowed to flow into the unit after which hydrogen is forced in under pressure until the final charged pressure in the unit is approximately two hundred fifty (250) pounds to the square inch. When the unit is thus charged, it is ready for operation and the major cycle of circulation is as follows:

The gas burner 19 is lighted and the thermostat for shutting off the gas in event the flame should accidentally be extinguished is held in the open position for a moment to allow the mercury therein to expand and thus assume control of the gas valve, then the thermostat is released and the entire unit is ready for operation requiring no further attention. The ignited gas from the burner 19 slowly heats the strong solution in sub-generator C causing the ammonia contained in the water solution to be driven off in the form of a gas, because the absorbing ability of water for ammonia decreases as the temperature increases. Due to the heat being applied, the ammonia is driven off so rapidly that in passing up the small thermo-syphon or percolator pipe T it carries with it globules of the liquid from the sub-generator exactly the same as the action of a common coffee percolator.

The liquid that passes up the thermo-syphon tube T is no longer a strong solution, as it has had an appreciable percentage of ammonia driven off. However, there is still some ammonia contained in the liquid, and this liquid spills from the top of the thermo-syphon tube into the generator D and again comes in contact with the heat from the flue gases passing through the generator D where most of the remaining ammonia is distilled out. The ammonia in gaseous form passes through the tube J which inclines upwardly all the way to the rectifier K so that any of the absorption liquid that may have become entrained in the gas flow returns downwardly by gravity into the generator D when it condenses in the rectifier K. The condensing action is due to the existing pressure and the cooling effect of the radiating fins 26 around the rectifier K and also to the baffle plates 27 in the rectifier. Dry ammonia gas is now at the top of the rectifier and entering the top of the ammonia condenser coil L which coil winds spirally downwardly through a large area of radiating fins, the function of which is to dissipate the specific and latent heat of the ammonia gas and in conjunction with the total pressure within the system cause the ammonia gas to condense and form a sealed liquid line just before reaching the liquid ammonia receiver M in the evaporator N.

The liquid ammonia receiver M has a cubical area sufficient to hold all the ammonia that has been distilled out of the absorption liquid until the cooling coil G has filled and ready to begin overflowing into the absorber H. When the liquid ammonia receiver M is full, the ammonia is then ready to begin spilling over into the evaporator N where it is caused to evacuate or boil by absorbing heat and thus produce refrigeration in the interior of the cabinet 1.

Upon entering the evaporator the liquid ammonia comes in contact with hydrogen gas in a comparatively large container where there is no longer any chance for the liquid to form a seal and due to the presence of hydrogen gas, the ammonia begins to evaporate in an effort to create for itself its own vapor pressure and this vapor mixes with the hydrogen gas, which for all practical purposes acts as an agent to cause the ammonia to evaporate. The reason for this action will be explained in detail later.

In the evaporator there is now a mixture of ammonia and hydrogen gases which mixture is heavy as compared to the weight of hydrogen gas alone, due to the fact that a mixture of ammonia and hydrogen is heavier, the greater the percentage of ammonia. This comparatively heavy mixture of gases therefore tends to seek the lowest possible level and flows downward through the evaporator over the series of plates 31, the function of which is to retard the flow of and afford as great an area of exposed wetted surface as is possible for the liquid ammonia, so that the evaporation and diffusion of these two gases may be complete. This mixture of ammonia and hydrogen gases then passes out through the inner tube S of the gas heat exchanger O through tube P to strong liquid receiver X, thence upwardly through the absorber H.

In tracing the course of the weak absorption liquor, the cycle is begun in the sub-generator C. When the absorption liquid is carried up through the thermo-syphon tube T by the rapid movement of the ammonia gas it is brought back into the outer shell of the generator D to be further denuded of its ammonia charge, due to the continued action of the hot flue gases passing up through the interior tube. A solution of ammonia and water is specifically lighter than pure water and it follows that the liquid at the bottom of the generator D would contain the least amount of ammonia for the reason just stated and also for the reason that at this point, that is to say, the bottom of the generator D is nearest to the source of heat. Therefore liquid in the bottom of the generator is for all practical purposes pure distilled water.

The arcuate tube E allows the hot distilled water to enter the outer shell of the liquid heat exchanger F which is a double shell pipe constructed on the counter-flow principle, and an exchange of heat is effected with the strong ammonia and water liquid flowing through conductor Y. The comparatively cool liquid coming from the strong liquor receiver X through the tube Y is preheated before entering the sub-generator C.

The check valve 48x in the gooseneck 47 prevents any back flow of the hot liquor to strong liquid receiver X. The hot distilled water is slightly precooled before entering the cooling coil G through the tube Z. Since this absorbing liquid is hotter than room temperature when it enters the cooling coil at the top, it follows that the top of the coil will always be the hottest portion, which fact tends to create a draft of cool air into the lower unit disposed in the chamber 11.

By the time the distilled water of the absorption liquid reaches the bottom of the cooling coil G its temperature has been reduced to within about two degrees above atmosphere. Since the top of the generator D is several inches above the highest point of the cooling coil G, some point in the generator between the top of the cooling coil G and the top of the thermo-syphon pipe T becomes the hydrostatic head of the absorption liquid and causes the absorption liquid to rise in the line Z to the top of the cooling coil G.

At this point in the description, the absorption liquid has had the refrigerant removed from it, and has filled up the cooling coil G and is ready to spill over into the top coil of the absorber H through conductor 51. On the other hand, the ammonia has been driven from the absorption liquid cooled and condensed in the condensing coil L and the liquid refrigerant receiver M is filled ready to spill onto the plate 31 in the evaporator N.

The liquid ammonia flows out of the evaporator N in the gaseous state through the gas heat exchanger O through the tube P to the strong liquid receiver X thence to the lowermost tube of the absorber H where it first comes into contact with the absorption liquid and a portion of this ammonia gas is absorbed by the absorption liquid flowing down through the coils of the absorber H and returned to the strong liquid receiver X.

However, a part of this ammonia gas travels upwardly through the coils of the absorber H before it is wholly absorbed by the water, thus completing the major cycle.

At this point, the absorption operation will be described more fully. The distilled water flows down through pipe 51 from the cooling coil G and enters into the upper convolution U of the absorber H. The convolutions U of the absorber H are greater in diameter than the individual loops I formed at each end of the convolutions. The ammonia and hydrogen gases from the tube P enter the lowermost convolution of the absorber H and flow upwardly through the convolutions U, due to the preponderating gas head of the tube P and to the fact that as the gases move upwardly through the absorber, they become lighter as they come into contact with the absorption liquid until all of the ammonia is absorbed by the down flowing weak water solution.

By the time the gas has reached the upper convolution U of the absorber H, the absorption liquid has absorbed the ammonia gas and consequently the weak liquid has become a strong mixture of water and ammonia. The amount of ammonia that will be absorbed by the water at any point is dependent upon the temperature of the water.

At the time that the water and ammonia come into contact with each other in the absorber, the ammonia gives off the heat it has absorbed during its evaporative period and this heat is dissipated through the thin walls of the tubes I assisted by the fins 63 disposed about the convolutions U and the loops I.

In order to effect a thermometric gradient or head, so that the heat will flow rapidly downwardly to the maximum atmospheric temperature in which the apparatus will ever be required to operate, it has been found that the best efficiency is produced by having a temperature of approximately one hundred and thirty-five (135) degrees Fahrenheit, in the absorber, which temperature corresponds to a pressure of two hundred and eighty (280) pounds per square inch in the absorber in order to effect complete reabsorption.

A unit of volume of the absorption liquid in the large convolutions U is carried down through the smaller cooling loops I whereupon the flow is consequently greatly slowed down. This will allow ample time for the absorption liquid to cool, assisted by the great area of radiating fins before it again passes into the presence of ammonia gas in the lower convolution of the absorbing tubes, whereupon it is again in condition to absorb additional ammonia gas until its temperature rises to a point beyond which no more absorption is possible.

This action is repeated several times, as can be clearly noted from the accompanying drawings, before a unit of volume of the absorption liquid finally reaches the strong liquid receiver in its original saturated condition, and ready to be again drawn into the generator for another cycle.

When the charge of ammonia and water was allowed to flow into the unit, this charge occupied only the strong liquid receiver X, the tube 46, the sub-generator and the lower portion of the thermo-syphon pipe T, whereas the hydrogen gas occupied all other void space in the system. However, due to the motivating force of the flame from burner 19, several things has taken place.

The liquid level has been raised from that of the strong liquid receiver X to a point in the generator D between the top of the thermo-syphon tube T and the top of the cooling coil G. Ammonia gas has been distilled off and subsequently cooled, condensed to a liquid and evaporated in the presence of hydrogen gas. The distilled water has passed through the generator down thru the liquid heat exchanger F preheated the strong liquid entering the sub-generator C and passed on up through the tube Z to the cooling coil G whereby the latter is filled.

The hydrogen gas has been forced out of all tubes, leaving them as sealed liquid lines, and thus preventing the hydrogen from ever again entering them. The hydrogen gas exerts the highest pressure in the system, except in tube J, where, due to its temperature, the ammonia gas pressure exceeds that of the hydrogen. The hydrogen therefore exerts a total pressure only upon the liquid surfaces in various parts of the system.

Now the ammonia must be separated from the hydrogen in the absorber so that the hydrogen can find its way back to the top of the evaporator N to continue its cycle, and the ammonia taken from the absorber to the liquid receiver to be used again. This is accomplished by the absorption liquid, since it is a well known fact that water has no affinity for hydrogen. However, it does have a very strong affinity for ammonia gas, therefore the water denudes the hydrogen of its ammonia charge which then leaves the hydrogen gas extremely light as compared with a mixture of ammonia and hydrogen gases.

In the latter case, the hydrogen tends to seek the highest possible level which in this case is at the top of the evaporator, but to reach the top of the evaporator, it must first pass through the tubes Q in the gas heat exchanger O where the outflowing cold mixture of ammonia and hydrogen gases will cool this returning pure hydrogen gas before it again reaches the evaporator.

As an explanation why the presence of hydrogen gas causes the liquid ammonia to evaporate, it will be best to review Dalton's Law of Gaseous Pressures, which states that every portion of a mass of gases inclosed in a vessel contributes to the pressure against the walls of the vessel the same amount that one gas would have exerted by itself, had no other gas been present. The evaporation or boiling point of any liquid is determined by the pressure exerted on that liquid by its own vapor pressure and it is not necessarily the conditions of surrounding temperature and pressure.

Therefore, if it be assumed that we have a closed container filled with hydrogen gas under any pressure and temperature and that into this container we gradually inject liquid ammonia, the container as yet having absolutely no ammonia pressure, the liquid ammonia might as well be flowing into a perfect vacuum. Immediately the ammonia will start evaporating in an effort to create its own vapor pressure under these given conditions, which evaporation continues, until a point of equilibrium is reached corresponding to the surrounding temperature and pressure.

However, if the bottom of the container is open and a gradual flow of gas is permitted to pass out at this opening as fast as it flows in at the top, any amount of ammonia injected into the container will completely evaporate since it would never be able to reach its vapor pressure or equilibrium corresponding to the conditions of temperature and pressure.

By reason of this fact there is a continual circulation of hydrogen gas which is carrying away the ammonia vapor as fast as it forms. The above conditions have been created in the system under discussion herein.

As stated before, the final charged pressure of this system is approximately two hundred and fifty (250) pounds to the square inch, which pressure is constant throughout the entire system. The operating pressure however, due to a slight rise in temperature within the absorber, increases to approximately two hundred and eighty (280) pounds to the square inch.

Under these conditions of pressure, the hydrogen remains a gas and the ammonia a liquid. The liquid ammonia gradually spills from the receiver M into the evaporator in the presence of hydrogen gas and immediately starts evaporating in an effort to create its own vapor pressure. This evaporation is accompanied by a fall in temperature corresponding to the reduction of vapor pressure and this evaporation and mixing goes on, until the ammonia vapor has reached the partial pressure in the mixture of gases which corresponds to the existing conditions of temperature and pressure in the evaporator.

As the ammonia is thus diffused into the hydrogen, its partial pressure falls, but the total pressure in the evaporator remains the same, as in all other parts of the system. As before stated, this mixture of gases sinks downward through the evaporator due to its higher specific gravity than pure hydrogen and passes through the gas heat exchanger O to the absorber where the shower of absorption liquid denudes the hydrogen gas of its ammonia charge at which time the hydrogen thus liberated assumes the total pressure in the upper part of the absorber and because it is light in weight, will seek the highest point in the system, which is at the top of the evaporator.

Consequently, there is a continual circulation of gas between the strong liquid receiver X, the absorber H and gas heat exchanger O and evaporator N.

The above explanation covers the major cycle of all agents contained in the system. However, in this major cycle, there are three sub-cycles which are set out below.

First, an absorption liquid cycle or water cycle.

Second, a refrigerating agent cycle, or ammonia cycle.

Third, an auxiliary agent cycle, or hydrogen cycle.

The absorption liquid cycle starts from the sub-generator C and this liquid is carried by the thermo-syphon tube T into the generator D. The sub-generator C and the generator D are separated by a bulk head plate 16, just below the tube E leading to the liquid heat exchanger F. The flow is then downwardly through the tube E to the liquid heat exchanger F, upward through the tube Z to the top convolution of the cooling coil G, then downward through the coil G, up one leg of the goose neck 50, down the tube 51 emptying into the uppermost convolution U of the absorber H.

From the convolution U, the absorption liquid flows downward in one leg of the auxiliary loop I and upward in the other leg thereof, then the absorption liquid passes transversely along the horizontal convolution U to the other end thereof, where it is conducted through the auxiliary loop in the same manner as stated above. The absorption liquid continues this tortuous course by gravitational force until it reaches the strong liquid receiver X, from which it is drawn into the sub-generator through the tube Y in which is disposed a goose neck 47 containing the check valve 48.

The function of the check valve 48 is to effect a pressure gradient in the sub-generator sufficient to overcome the specific weight of the column of liquid in the thermo-syphon tube T so that it will be raised to the new hydrostatic head in the generator D, thereby assuring a positive directional flow of the liquid thru the system.

When this unit of volume of the absorption liquid has been thus raised and discharged into the generator D, the thermo-syphon tube T is momentarily clear of liquid, which immediately allows the total pressure of the system to become equalized, then due to the hydrostatic head in the liquid receiver X, the check valve is caused to open and allow the strong liquid to pass in through the sub-generator and rise in the thermo-syphon tube T to the level of that of the liquid in the receiver X. The operation of the apparatus is continual repetition of the above function.

The ammonia cycle is from the sub-generator C through the thermo-syphon tube T, to generator D, then through the inclined tube J to the rectifier K. From the rectifier K through the cooling and condensing coil L, to the liquid ammonia receiver M, through the evaporator N through the tube S of the gas heat exchanger O and then through the tube P to the absorber H from where the flow is through the strong liquid receiver X and again to the sub-generator through the tube Y.

The hydrogen cycle is from the absorber H through the outer shell 36 of the gas heat exchanger O, to the top of the evaporator, and downward through the evaporator to the gas heat exchanger, through the inner tube S thereof, back to the absorber through the tube P.

The operation of the machine is a repetition of these cycles which overlap and intermesh and it will operate continuously without attention so long as the heat is applied to the generator.

As before stated, the unit is designed to withstand an internal pressure of five thousand pounds per square inch. The unit is fully charged and ready for operation before it leaves the factory and from research available, will never require recharging. The seventy-five pound unit is designed to operate at maximum efficiency with a heat input of approximately fifteen hundred B. t. u.'s per hour which heat is dissipated by both the top ammonia coil L and the absorbing liquid coil G.

The corresponding heat extractions from the interior of the cabinet is approximately equal to that of the melting of slightly over three pounds of ice at thirty-two (32) degrees Fahrenheit per hour, or a B. t. u. extraction of approximately four hundred and fifty (450) per hour, which heat is dissipated by the radiating fins and surfaces of the absorber due to its novel construction heretofore pointed out.

While the invention has been described as operating with water as an absorption medium, ammonia as a refrigerant, and hydrogen as an inert non-condensable gas, it is to be understood that the use of other media is contemplated. Furthermore, it is to be understood that by describing in detail herein any particular form, structure, arrangement or sequence of operation, it is not intended to limit the invention beyond the terms of the several claims or the requirements of the prior art.

I claim:

1. An absorbing unit for refrigerators comprising a tubular coil, a plurality of tubular coil loops connected at spaced points on said coil whereby fractions of fluid may be successively by-passed out of the main body of said fluid in said coil, and cooling fins on the coil and loops.

2. An absorbing unit for refrigerators comprising a tubular coil, a plurality of tubular coil loops connected at spaced points on said coil whereby fractions of fluid may be successively by-passed out of the main body of said fluid in said coil, and cooling fins on the coil and loops, said loops substantially of U-shaped formation.

3. An absorbing unit for refrigerators comprising a tubular coil, a plurality of tubular coil loops connected at spaced points on said coil whereby fractions of fluid may be successively by-passed out of the main body of said fluid in said coil, and cooling fins on the coil and loops, said loops being substantially of U-shaped formation, said loops being of greater lineal extent than and of less diameter than the coil.

4. An absorbing unit for refrigerators comprising a tubular coil, a plurality of tubular coil loops connected at spaced points on said coil whereby fractions of fluid may be successively by-passed out of the main body of said fluid in said coil, and cooling fins on the coil and loops, said tubes being horizontally disposed and said loops depending therefrom to retard the flow of a unit of volume of an absorbing agent so as to dissipate the heat of solution of the cooling agent to be dissipated by air convection, thereby causing the absorbing agent to absorb to its original saturation point the cooling agent in time to begin another cycle of operation.

5. An absorbing unit for refrigerators comprising a tubular coil, a plurality of tubular coil loops connected at spaced points on said coil whereby fractions of fluid may be successively by-passed out of the main body of said fluid in said coil, and cooling fins on the coil and loops, said loops being substantially of U-shaped formation, said tubes being horizontally disposed and said loops depending therefrom to retard the flow of a unit of volume of an absorbing agent so as to dissipate the heat of solution of the cooling agent to be dissipated by air convection, thereby causing the absorbing agent to absorb to its original saturation point the cooling agent in time to begin another cycle of operation.

6. An absorbing unit for refrigerators comprising a tubular coil, a plurality of tubular coil loops connected at spaced points on said coil whereby fractions of fluid may be successively by-passed out of the main body of said fluid in said coil, and cooling fins on the coil and loops, said loops being substantially of U-shaped formation and being of greater lineal extent than and of less diameter than the coil, said tubes being horizontally disposed and said loops depending therefrom to retard the flow of a unit of volume of an absorbing agent so as to dissipate the heat of solution of the cooling agent to be dissipated by air convection, thereby causing the absorbing agent to absorb to its original saturation point the cooling agent in time to begin another cycle of operation.

7. In absorption refrigerating apparatus, an absorber comprising a main vessel, means for conveying refrigerant gas to be absorbed to said vessel, means for bringing absorption liquid into contact with said gas at a plurality of successive stages and means for conveying fractions of said liquid to points outside of said vessel in between the stages and there cooling the same.

8. In absorption refrigerating apparatus, an absorber consisting of a main vessel, means for conveying refrigerant gas to said vessel and means for alternately bringing an absorption liquid into contact with the refrigerant gas in the vessel and conveying fractions of said liquid outside of said vessel into heat transfer relation with a cooling medium.

9. The method of causing the absorption of a gas, as a refrigerant gas, in a liquid which includes the steps of successively bringing the liquid into contact with the gas to cause the liquid to absorb some of the gas to form a solution, conveying fractions of the solution into heat exchange relation with a cooling medium and again bringing it into contact with the gas to form a stronger solution while preventing the stronger solution from mixing with the first formed solution.

10. In absorption refrigerating apparatus the combination of an evaporator wherein a refrigerant may evaporate in the presence of an inert gas, an absorber, means for circulating the inert gas between the evaporator and absorber to convey the refrigerant gas from the evaporator to the absorber, means for bringing absorption liquid into contact with the gases in the absorber and means for repeatedly conveying fractions of the liquid out of the presence of the gases in the absorber, cooling it and again bringing it into the presence of the gases in the absorber.

11. In absorption refrigerating apparatus, an absorber comprising a main vessel, means for conveying refrigerant gas to be absorbed to said vessel, means for bringing absorption liquid into contact with said gas at a plurality of successive stages and means for conveying fractions of said liquid to points outside of said vessel in between the stages and there cooling the same.

12. In absorption refrigerating apparatus, an absorber consisting of a main vessel, means for conveying refrigerant gas to said vessel and means for alternately bringing an absorption liquid into contact with the refrigerant gas in the vessel and conveying fractions of said liquid outside of said vessel into heat transfer relation with a cooling medium.

13. The method of causing the absorption of a gas, as a refrigerant gas, in a liquid which includes the steps of successively bringing the liquid into contact with the gas to cause the liquid to absorb some of the gas to form a solution, conveying fractions of the solution into heat exchange relation with a cooling medium and again bringing it into contact with the gas to form a stronger solution while preventing the stronger solution from mixing with the first formed solution.

14. In absorption refrigerating apparatus the combination of an evaporator wherein a refrigerant may evaporate in the presence of an inert gas, an absorber, means for circulating the inert gas between the evaporator and absorber to convey the refrigerant gas from the evaporator to the absorber, means for bringing absorption liquid into contact with the gases in the absorber and means for repeatedly conveying fractions of the liquid out of the presence of the gases in the absorber, cooling it and again bringing it into the presence of the gases in the absorber.

15. In absorption refrigerating apparatus, an absorber consisting of a main conduit adapted to convey absorption liquid by means of gravity, and adapted to convey refrigerant gas in counter-flow relation to said liquid, and means for successively tapping off fractions of said liquid in its flow through said conduit, and returning them to lower points in said conduit, whereby said tapped off fractions are cooled outside of the conduit.

16. The method of causing the absorption of refrigerant gas in a liquid comprising conducting absorption liquid by means of gravity through a conduit and introducing a refrigerant gas into the lower portion of said conduit and causing it to pass in counter-flow relation to said absorption liquid in said conduit, successively tapping off fractions of said liquid from said conduit, conducting said fractions into heat exchange relation with the atmospheric air in order to cool said fractions, and returning said fractions to lower points in the conduit from the points where the respective fractions were tapped off, and withdrawing from the lower portion of said conduit the liquid with refrigerant gas absorbed therein.

17. The method of causing the absorption of refrigerant gas in a iquid comprising conducting absorption liquid by means of gravity through a conduit and introducing into the lower portion of said conduit a refrigerant gas and an inert gas and causing it to pass in counter-flow relation to said absorption liquid in said conduit, successively tapping off fractions of said liquid from said conduit, conducting said fractions into heat exchange relation with the atmospheric air in order to cool said fractions, and returning said fractions to lower points in the conduit from the points where the respective fractions were tapped off, and withdrawing from the lower portion of said conduit the liquid with refrigerant gas absorbed therein, and withdrawing said inert gas from the upper portion of said conduit.

18. The method of causing the absorption of refrigerant gas in a liquid comprising conducting absorption liquid by means of gravity through a conduit and introducing into the lower portion of said conduit a refrigerant gas and an inert gas and causing it to pass in counter-flow relation to said absorption liquid in said conduit, successively tapping off fractions of said liquid from said conduit, conducting said by-passed fractions into heat exchange relation with a cooling medium, and returning said fractions to lower points in the conduit from the points where the respective fractions were tapped off, and withdrawing from the lower portion of said conduit the liquid with refrigerant gas absorbed therein, and withdrawing said inert gas from the upper portion of said conduit.

JACKSON LEE CAMPBELL.